(12) United States Patent
Zhang et al.

(10) Patent No.: US 12,362,490 B2
(45) Date of Patent: Jul. 15, 2025

(54) FEED LINE FILTERING ANTENNA AND COMMUNICATION DEVICE

(71) Applicants: South China University of Technology, Guangzhou (CN); Huawei Technologies Co. Ltd., Shenzhen (CN)

(72) Inventors: Xiuyin Zhang, Guangzhou (CN); Linling Wu, Guangzhou (CN); Huiliang Xu, Shenzhen (CN); Huafeng Su, Guangzhou (CN)

(73) Assignee: South China University of Technology, Guangzhou (CN)

( * ) Notice: Subject to any disclaimer, the term of this patent is extended or adjusted under 35 U.S.C. 154(b) by 0 days.

(21) Appl. No.: 18/845,112

(22) PCT Filed: Oct. 13, 2022

(86) PCT No.: PCT/CN2022/125207
§ 371 (c)(1),
(2) Date: Dec. 23, 2024

(87) PCT Pub. No.: WO2023/168941
PCT Pub. Date: Sep. 14, 2023

(65) Prior Publication Data
US 2025/0174901 A1    May 29, 2025

(30) Foreign Application Priority Data
Mar. 7, 2022   (CN) .......................... 202210213719.8

(51) Int. Cl.
*H01Q 1/38*    (2006.01)
*H01Q 9/04*    (2006.01)
(Continued)

(52) U.S. Cl.
CPC ......... *H01Q 9/0485* (2013.01); *H01Q 13/206* (2013.01)

(58) Field of Classification Search
CPC .. H01Q 1/36; H01Q 1/48; H01Q 1/50; H01Q 9/04; H01Q 9/0485; H01Q 9/28;
(Continued)

(56) References Cited

U.S. PATENT DOCUMENTS

| 4,203,116 A | * | 5/1980 | Lewin | H01Q 13/206 |
| | | | | 343/846 |
| 4,660,047 A | * | 4/1987 | Wolfson | H01Q 9/065 |
| | | | | 343/700 MS |

(Continued)

FOREIGN PATENT DOCUMENTS

| CN | 105870619 A | 8/2016 |
| CN | 205752533 U | 11/2016 |

(Continued)

OTHER PUBLICATIONS

Jagadish Baburao Jadhav; Filtering Antenna With Radiation and Filtering Functions for Wireless Applications, Oct. 19, 2016.
(Continued)

*Primary Examiner* — Tho G Phan
(74) *Attorney, Agent, or Firm* — The Dobrusin Law Firm, PC

(57) ABSTRACT

Disclosed are a feed line filtering antenna and a communication device. The antenna comprises a feed line structure and radiator structures, the feed line structure serves as a first-order resonator, the radiator structures are loaded on the feed line structure, and form a two-order filter together with the feed line structure as a last-order resonator, a band-pass filtering effect of the radiator structures is achieved by controlling the coupling between the first-order resonator and the last-order resonator; when a feed line filtering antenna having three or more orders is achieved, an additional resonator is coupled on a feed line filtering antenna having two orders. According to the present invention, in-band and out-of-band interference can be effectively (Continued)

filtered, the return loss and efficiency of the antenna are not greatly changed compared with those of a single antenna, and the horizontal radiation and gain requirement of the vehicle-mounted antenna can be ensured.

12 Claims, 8 Drawing Sheets

(51) Int. Cl.
   *H01Q 9/28* (2006.01)
   *H01Q 13/20* (2006.01)
(58) Field of Classification Search
   CPC ...... H01Q 9/285; H01Q 13/20; H01Q 13/206; H01Q 15/00
   See application file for complete search history.

(56) References Cited

U.S. PATENT DOCUMENTS

| | | | | |
|---|---|---|---|---|
| 7,138,954 | B2 * | 11/2006 | Schillmeier | H01Q 9/285 |
| | | | | 343/795 |
| 8,872,715 | B2 * | 10/2014 | Lea | H01Q 21/26 |
| | | | | 343/810 |
| 9,799,952 | B2 * | 10/2017 | Bojer | H01Q 1/50 |
| 11,075,452 | B2 * | 7/2021 | Crouch | H01Q 1/48 |
| 11,695,197 | B2 * | 7/2023 | Lv | H01Q 1/50 |
| | | | | 343/702 |
| 2005/0261135 | A1 | 11/2005 | Yamanaka et al. | |
| 2007/0069838 | A1 | 3/2007 | Kayano et al. | |
| 2020/0235481 | A1 | 7/2020 | Carceller et al. | |
| 2022/0231390 | A1 | 7/2022 | Uemichi | |

FOREIGN PATENT DOCUMENTS

| | | | |
|---|---|---|---|
| CN | 106299671 | A | 1/2017 |
| CN | 106684548 | A | 5/2017 |
| CN | 107302131 | A | 10/2017 |
| CN | 107394369 | A | 11/2017 |
| CN | 110474156 | A | 11/2019 |
| CN | 111934090 | A | 11/2020 |
| CN | 113381175 | A | 9/2021 |
| CN | 113690607 | A | 11/2021 |
| CN | 114336015 | A | 4/2022 |
| JP | 6767591 | B1 | 12/2020 |

OTHER PUBLICATIONS

International Search Report dated Jan. 5, 2023, Application No. PCT/CN2022/125207.

* cited by examiner

FEED LINE FILTERING ANTENNA AND COMMUNICATION DEVICE

FIELD OF THE INVENTION

The present disclosure relates to a feed line filtering antenna and a communication device, and belongs to the field of multi-frequency base station antennas in wireless mobile communication.

BACKGROUND OF THE INVENTION

In recent years, with the rapid development of modern wireless communication systems, the frequency bands required for mobile communication have increased significantly. This has led to strong mutual coupling between antennas at different frequency bands when the antennas coexist in a confined space, resulting in degraded antenna performance and further impairing the performance of wireless communication systems.

For example, in the current era of the Internet of Vehicles, the vehicle-mounted antenna system integrates Internet of Vehicles antennas with satellite navigation antennas, as well as 2G/3G/4G/5G antennas. This results in a large number of antennas operating in different frequency bands in the confined space of the vehicle-mounted shark fin wireless communication system, where the antennas interfere with each other when operating, leading to degraded communication quality. In order to solve this problem, a method for increasing the antenna spatial isolation or adding an additional filter has been used previously. However, in the context of application terminals where the product size is constrained and there are many communication frequency bands, the aforementioned method has obvious drawbacks. The overall size, loss, and radiation characteristics of the antenna cannot meet the increasingly high communication requirements. In contrast, the method of fusing the filter and antenna together is advantageous. Filtering antennas in communication systems may improve the isolation between communication frequency bands without significantly increasing volume, thereby further improving communication quality. Therefore, in terminal products such as vehicle-mounted terminals, antennas with filtering effects will have significant development prospects.

SUMMARY OF THE INVENTION

An object of the present disclosure is to overcome the above-mentioned shortcomings and deficiencies in the related art and provide a feed line filtering antenna in the context of the application of a 5G base station so that in-band and out-of-band interference can be effectively filtered, the return loss and efficiency of the antenna are not greatly changed compared with those of a single antenna, and the horizontal radiation and gain requirement of the vehicle-mounted antenna can be ensured.

Another object of the present disclosure is to provide a communication device.

The object of the present disclosure may be achieved by adopting the following technical solutions.

A feed line filtering antenna is provided, including a feed line structure and radiator structures, where the feed line structure serves as a first-order resonator; the radiator structures are loaded on the feed line structure, serve as a last-order resonator, and form a two-order filter together with the feed line structure; a band-pass filtering effect of the radiator structures is achieved by controlling the coupling between the first-order resonator and the last-order resonator; when a feed line filtering antenna having three or more orders is achieved, an additional resonator is coupled on a feed line filtering antenna having two orders.

Further, the feed line structure adopts a parallel double-line resonator; the parallel double-line resonator includes an upper surface microstrip line and a lower surface microstrip line, and the upper surface microstrip line and the lower surface microstrip line have the same shape and size.

Further, one end of the parallel double-line resonator is short-circuited, and the other end of the parallel double-line resonator is open-circuited; or two ends of the parallel double-line resonator are short-circuited or open-circuited.

Further, when one end of the parallel double-line resonator is short-circuited, and the other end of the parallel double-line resonator is open-circuited, a quarter-wavelength open-circuit line is added to the short-circuited end, or a quarter-wavelength short-circuit line is added to the open-circuited end.

Further, when two ends of the parallel double-line resonator are short-circuited, the height of the parallel double-line resonator is adjustable to control the resonant frequency of the first-order resonator.

Further, the parallel double-line resonator is connected to the radiator structures, and a line width of the parallel double-line resonator near the connection is adjustable to modulate a coupling coefficient between the first-order resonator and the last-order resonator.

Further, a feed structure of the feed line filtering antenna adopts a feed structure in which a microstrip line turns into parallel double lines; the microstrip line is located on an upper surface of the parallel double-line resonator and connected to a lower surface of the parallel double-line resonator through a metalized through hole, and the metalized through hole is not in contact with the upper surface of the parallel double-line resonator.

Further, the height of the metalized through hole of the feed structure is adjustable to modulate an external Q value of the parallel double-line resonator so as to control the coupling of external energy to the parallel double-line resonator.

Further, a plurality of radiator structures are provided and distributed from top to bottom; the radiator structures are the same, and a vertical spacing between two radiator structures is one wavelength to realize in-phase feeding and radiation same-direction superposition.

Further, each radiator structure is divided into an upper branch and a lower branch; the upper branch faces downwards, and the lower branch faces upwards; the upper branch and the lower branch have in-phase currents in the same direction in an operating frequency band and together form a dipole radiator.

Further, the lengths of the upper branch and the lower branch are less than a quarter wavelength, and a feed distance between the upper branch and lower branch is a half wavelength; the upper branch and the lower branch are jointly equivalent to series resonance.

Further, the size of each radiator structure is adjustable to control the resonant frequency of the last-order resonator, a coupling coefficient between the last-order resonator and the first-order resonator, and a radiation Q value.

Further, positions of the radiator structures are adjustable to adjust the energy coupled between the radiator structures and the parallel double-line resonator by adjusting a distance between the radiator structures and a current zero on the parallel double-line resonator.

Further, line widths of mid-section parallel double lines between each two adjacent radiator structures are adjustable to adjust a coupling coefficient between the first-order resonator and the last-order resonator as well as an antenna radiation Q value so as to control an upper side lobe of the antenna.

Another object of the present disclosure may be achieved by adopting the following technical solutions.

A communication device is provided, including the above-mentioned feed line filtering antenna.

Compared with the related art, the present disclosure has the following beneficial effects.

1. The feed line filtering antenna proposed in the present disclosure may ensure the horizontal radiation performance and gain requirement of a mobile communication antenna. It achieves high roll-off filtering characteristics while minimizing additional insertion loss and an occupied area caused by unnecessary structures. Furthermore, it significantly improves the inter-frequency isolation in the overall mobile communication system.
2. The feed line filtering antenna proposed in the present disclosure does not include an additional filter circuit, and has a simple antenna structure and no additional antenna volume, which has a practical engineering application value.
3. According to the present disclosure, the radiator in the form of a feed line serves as the last-order resonator of the filter and forms the first-order resonator together with parallel double lines short-circuited at two ends, thereby together achieving a second-order band-pass filtering response. In this embodiment, the coupling coefficient is adjustable, and thus the antenna bandwidth is controllable.
4. The feed line filtering antenna proposed in the present disclosure further improves the out-of-band radiation suppression by introducing a radiation zero at a low frequency using the presence of a current zero on the feed line structure in a specific mode, and achieves a minimum out-of-band suppression of 10 dB at a low frequency of 5-5.5 GHz.
5. The feed line filtering antenna proposed in the present disclosure has a band-pass filtering effect with high roll-off and good out-of-band suppression capabilities outside the passband, while having excellent radiation performance inside the passband. The manner in which the filtering performance is achieved does not incur additional processing costs, is widely applicable, and does not introduce additional insertion loss.
6. According to the feed line filtering antenna proposed in the present disclosure, the maximum radiation direction is horizontal, having good high-gain omnidirectional radiation performance. The radiation pattern has low out-of-roundness, and the horizontal radiation gain is relatively high.

BRIEF DESCRIPTION OF THE DRAWINGS

In order to more clearly illustrate the technical solutions in the embodiments of the present disclosure or in the related art, the drawings required in the descriptions of the embodiments or the related art will be briefly introduced below. Obviously, the drawings described below are only some embodiments of the present disclosure, and a person skilled in the art may obtain other drawings according to these drawings without involving any inventive effort.

Figure 1:
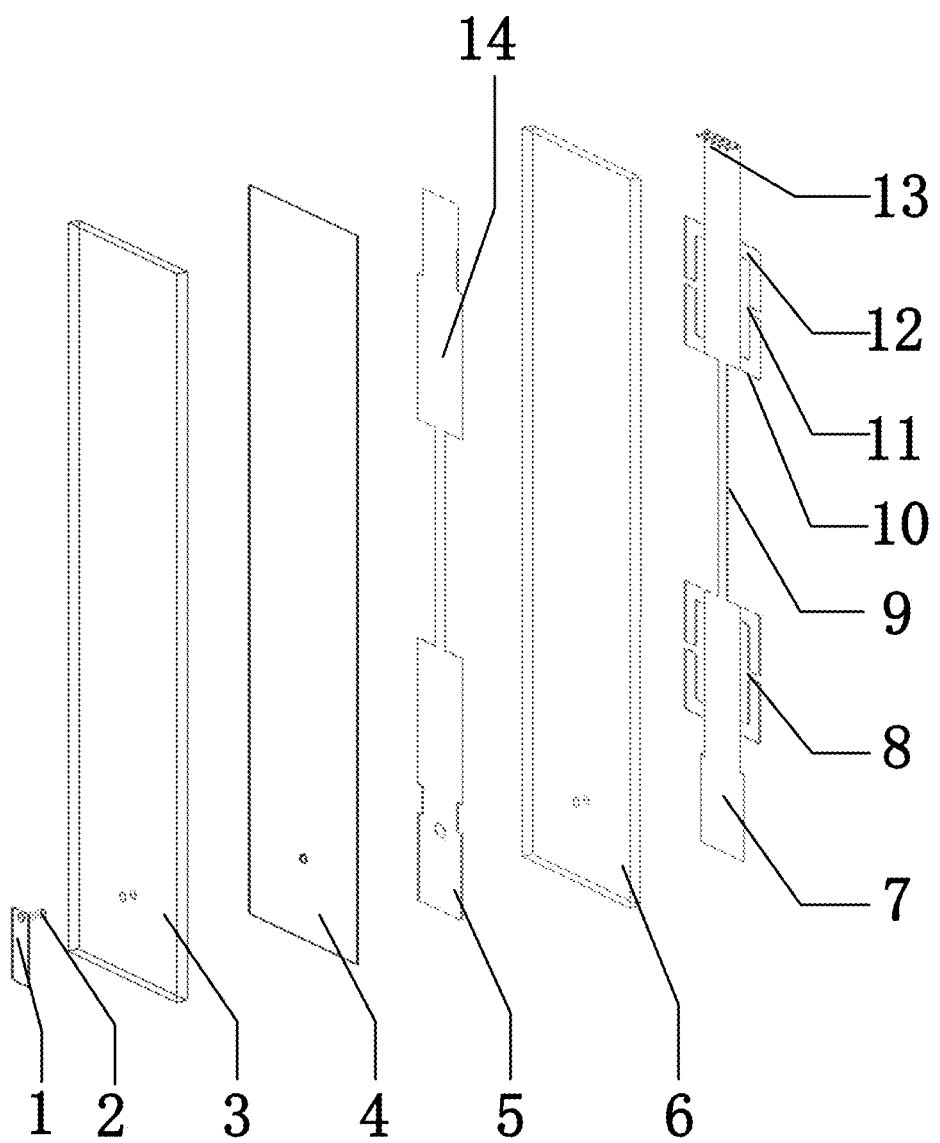
FIG. 1 is an exploded structural diagram of a feed line filtering antenna according to embodiment 1 of the present disclosure.

In the drawings, 1—microstrip line, 2—second metalized through hole, 3—first-layer dielectric substrate, 4—prepreg PP layer, 5—upper surface microstrip line, 6—second-layer dielectric substrate, 7—lower surface microstrip line, 8—lower radiator structure, 9—mid-section parallel double line, 10—lower branch, 11—upper radiator structure, 12—upper branch, 13—first metalized through hole, 14—parallel double-line resonator, and 15—gap.

DETAILED DESCRIPTION OF THE EMBODIMENTS

The technical solutions in the embodiments of the present disclosure will be clearly and completely described below in conjunction with the accompanying drawings in the embodiments of the present disclosure. Obviously, the described embodiments are only some embodiments of the present disclosure, not all embodiments. Based on the embodiments of the present disclosure, all other embodiments obtained by a person skilled in the art without inventive effort fall within the scope of the present disclosure.

Embodiment 1

Figure 2:
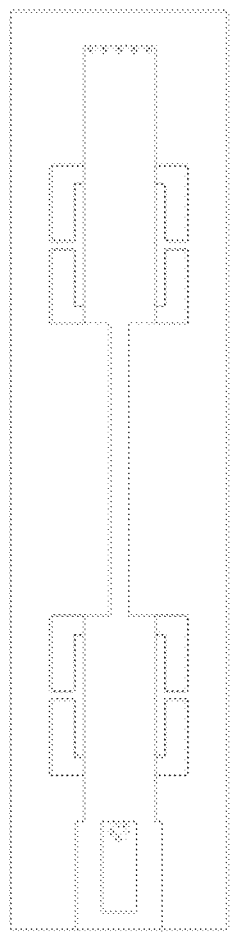
FIG. 2 is a front structural diagram of a feed line filtering antenna according to embodiment 1 of the present disclosure.
Figure 3:
FIG. 3 is a top structural diagram of a feed line filtering antenna according to embodiment 1 of the present disclosure.

As shown in FIGS. 1-3, this embodiment provides a feed line filtering antenna, which can be applied to a communication device. The communication device may be a receiving and transmitting device of a wireless communication system. The antenna includes a feed line structure and radiator structures. The feed line structure serves as a first-order resonator. The radiator structures are loaded on the feed line structure, serve as a last-order resonator, and form a two-order filter together with the feed line structure. A band-pass filtering effect of the radiator structures is achieved by controlling the coupling between the first-order resonator and the last-order resonator. Since the feed line filtering antenna in this embodiment is a second-order feed line filtering antenna, the last-order resonator serves as a second-order resonator, and the resonance characteristics of the first-order resonator and the second-order resonator are opposite.

In this embodiment, the feed line filtering antenna has two layers of dielectric substrates, i.e., a first-layer dielectric substrate 3 and a second-layer dielectric substrate 6, with a prepreg PP layer 4 in the middle. Three layers of metal structures are printed on a surface of the dielectric.

Further, the feed line structure adopts a parallel double-line resonator 14, and a top end is loaded with first metalized through holes 13. The parallel double-line resonator 14 includes an upper surface microstrip line 5 and a lower surface microstrip line 7. The upper surface microstrip line 5 and the lower surface microstrip line 7 have the same shape and size and together form the parallel double-line resonator. The upper surface microstrip line 5 is connected to the lower surface microstrip line 7 through the first metalized through holes 13. The bottom of the parallel double-line resonator may be placed on a floor so that the upper surface microstrip line 5 and the lower surface microstrip line 7 are grounded. The upper surface microstrip line 5 and the lower surface microstrip line 7 are supported by the second-layer dielectric substrate 6.

The parallel double-line resonator 14 may be short-circuited at one end and open-circuited at the other end, and may also be short-circuited or open-circuited at two ends, constituting parallel or series resonance. When one end of the parallel double-line resonator 14 is short-circuited, and the other end of the parallel double-line resonator 14 is open-circuited, a quarter-wavelength short-circuit line is added to the open-circuited end, or a quarter-wavelength open-circuit line is added to the short-circuited end, which does not affect the resonant frequency and equivalent resonance circuit of the original parallel double-line resonator 14 in an operating frequency band, and may effectively suppress an upper side lobe of the antenna radiation. In this embodiment, when two ends of the parallel double-line resonator 14 are short-circuited, the height of the parallel double-line resonator 14 is adjustable to control the resonant frequency of the first-order resonator. The parallel double-line resonator 14 is connected to the radiator structures, and a line width of the parallel double-line resonator 14 near the connection is adjustable to modulate a coupling coefficient between the first-order resonator and the second-order resonator, thereby controlling the bandwidth to obtain a filtering effect. In addition, the radiation performance of the antenna in the passband is substantially not affected while improving the out-of-band suppression.

Further, in this embodiment, two radiator structures are provided and symmetrically distributed from up and down. A vertical spacing between the two radiator structures is about one wavelength to realize in-phase feeding and radiation same-direction superposition. The sizes of the two radiator structures are adjustable to control the resonant frequency of the second-order resonator, a coupling coefficient between the second-order resonator and the first-order resonator (the parallel double-line resonator 14), and a radiation Q value. The two radiator structures are an upper radiator structure 11 and a lower radiator structure 8, and each radiator structure is divided into an upper branch 12 and a lower branch 10. The upper branch 12 faces downwards, and the lower branch 10 faces upwards. The upper branch 12 and the lower branch 10 have equivalent currents in the same direction in an operating frequency band and together form a dipole radiator. The lengths of the upper branch 12 and the lower branch 10 are slightly less than a quarter wavelength, and a feed distance between the upper branch 12 and the lower branch 10 is about a half wavelength. The upper branch 12 and the lower branch 10 are jointly equivalent to a series resonance. The shapes of the upper branch 12 and the lower branch 10 are variable, such as a triangle, and a sector. The upper branches 12 and the lower branches 10 of the two radiator structures are connected to the parallel double-line resonator 14 with two ends short-circuited, and are coupled and fed by the parallel double-line resonator 14. Positions of the radiator structures are adjustable to adjust the energy coupled between the radiator structures and the parallel double-line resonator 14 by adjusting a distance between the radiator structures and a current zero on the parallel double-line resonator 14. The coupling amount of the parallel double-line resonator 14 to the two radiator structures may be modulated by adjusting line widths of mid-section parallel double lines 9 between the two radiator structures to reduce a feed line antenna radiation Q value, thereby obtaining a good radiation pattern. When the line width is thinner, the coupling between the resonators is stronger, the antenna radiation Q value is smaller, and the antenna energy radiated is more. Therefore, the antenna gain may be further improved, and the upper side lobe of the antenna may be reduced. When the parallel double-line resonator 14 has an equivalent current zero in a non-operating frequency band, and the current zero is located between the upper branch 12 and the lower branch 10 of the radiator structure, the currents on the radiator structures are reversed, and radiation zeros are generated at the left and right sides of the passband of the feed line filtering antenna, thereby further improving the out-of-band suppression of the antenna, i.e., improving the selectivity of the antenna.

Further, in this embodiment, a feed structure of the feed line filtering antenna adopts a feed structure in which a microstrip line 1 turns into parallel double lines. The microstrip line 1 is supported by the first-layer dielectric substrate 3. The microstrip line 1 is located on an upper surface of the parallel double-line resonator 14 and connected to a lower surface of the parallel double-line resonator 14 through a second metalized through hole 2, and the second metalized through hole 2 is not in contact with the upper surface of the parallel double-line resonator 14. The height of the second metalized through hole 2 is adjustable to modulate an external Q value of the parallel double-line resonator 14 so as to control the coupling of external energy to the parallel double-line resonator 14.

Figure 4A:
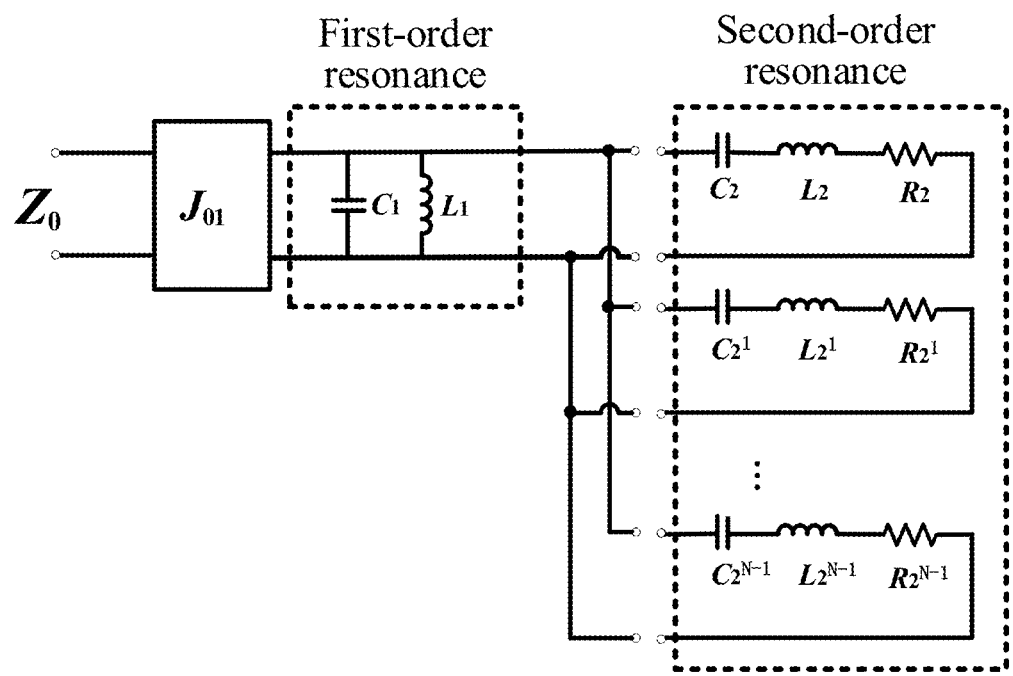
FIGS. 4a-4b are equivalent circuit diagrams of a feed line filtering antenna according to embodiment 1 of the present disclosure.
Figure 4B:
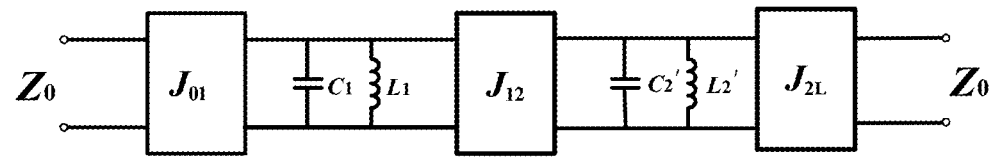
Figure 5A:
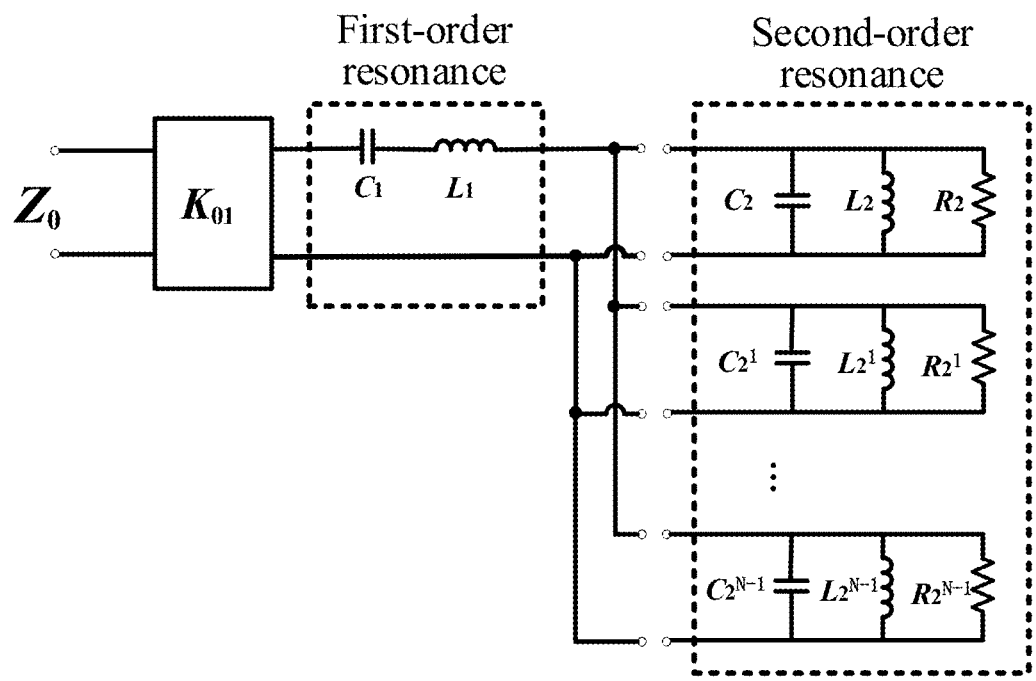
FIGS. 5a-5b are dual network diagrams of equivalent circuits of a feed line filtering antenna according to embodiment 1 of the present disclosure.
Figure 5B:
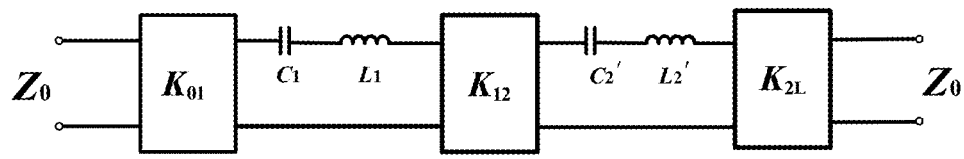

In this embodiment, the parallel double-line resonator 14 with two ends short-circuited is equivalent to a parallel resonance at an operating frequency point, i.e., being a first-order resonance in the equivalent circuits of FIGS. 4a-4b. The feed structure in which the microstrip line turns into parallel double lines is adopted, and the microstrip line 1 is punched and connected to feed the parallel double-line resonator 14. The microstrip line 1 is located on the upper surface of the parallel double-line resonator 14 and connected to the lower surface of the parallel double-line resonator 14 through the second metalized through hole 2, and the metalized through hole 2 is not in contact with the upper surface of the parallel double-line resonator 14. The feed structure of the parallel double-line resonator 14 is equivalent to the J converter $J_{01}$ in the equivalent circuits of FIGS. 4a-4b, which controls the coupling amount of an input end to the first-order resonator. The upper radiator structure 11 and the lower radiator structure 8 are symmetrical, with a spacing of about one guided wave wavelength, so they are fed in phase by a feed line resonator. Each radiator structure includes an upper branch 12 and a lower branch 10 which are symmetrical up and down and may be equivalent to a series resonance, i.e., a second-order resonance in the equivalent circuits of FIGS. 4a-4b. The second-order resonance in FIG. 4a consisting of a plurality of radiators may undergo series/parallel resonance conversion. Further, a single-port filter antenna network is converted into a two-port filter network using a relationship between a radiation Q value of a single-port antenna and a J or K converter. A two-order filter network as shown in FIG. 4b may be obtained by combining a plurality of sub-networks using the property of parallel sub-networks. The two radiator structures in this embodiment are directly connected to the parallel double-line resonator 14 with two ends short-circuited, and are coupled and fed (i.e., $J_{12}$) by the parallel double-line resonator 14. The dual networks of the above-mentioned equivalent circuits are shown in FIGS. 5a-5b.

Figure 6:
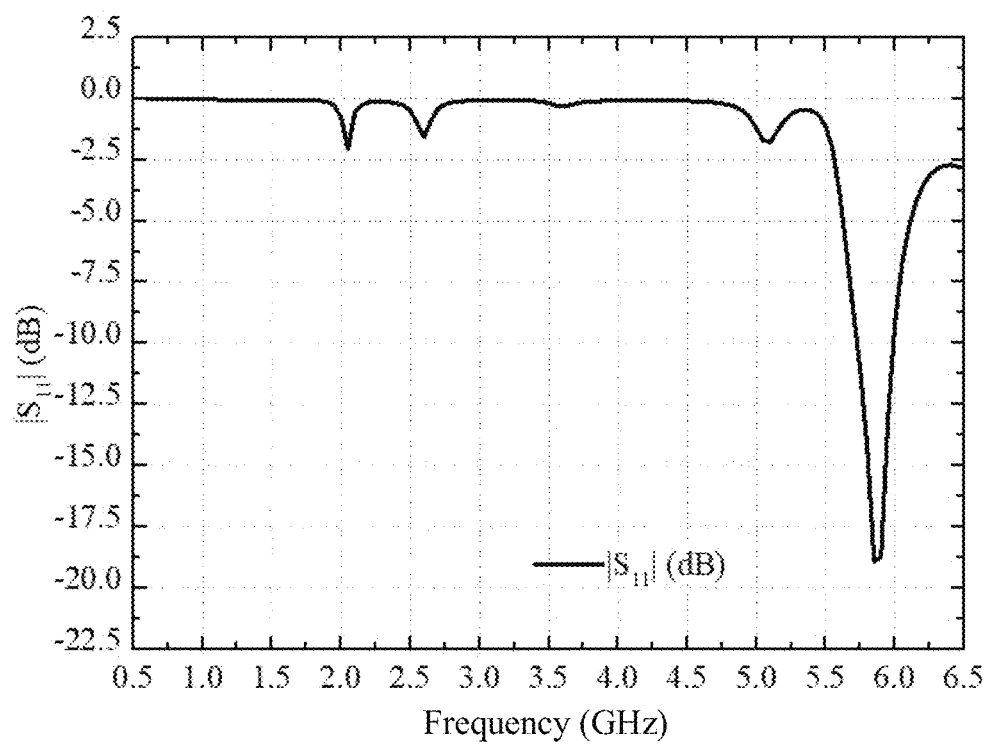
FIG. 6 is a graph showing a scattering parameter curve of a feed line filtering antenna according to embodiment 1 of the present disclosure.

As shown in FIG. 6, it is a simulation result diagram of reflection coefficient |S11|-frequency of the feed line filtering antenna according to this embodiment. The impedance matching in the passband is good, the impedance bandwidth is 5.8-6 GHZ, and the return losses are below −10 dB.

Figure 7:
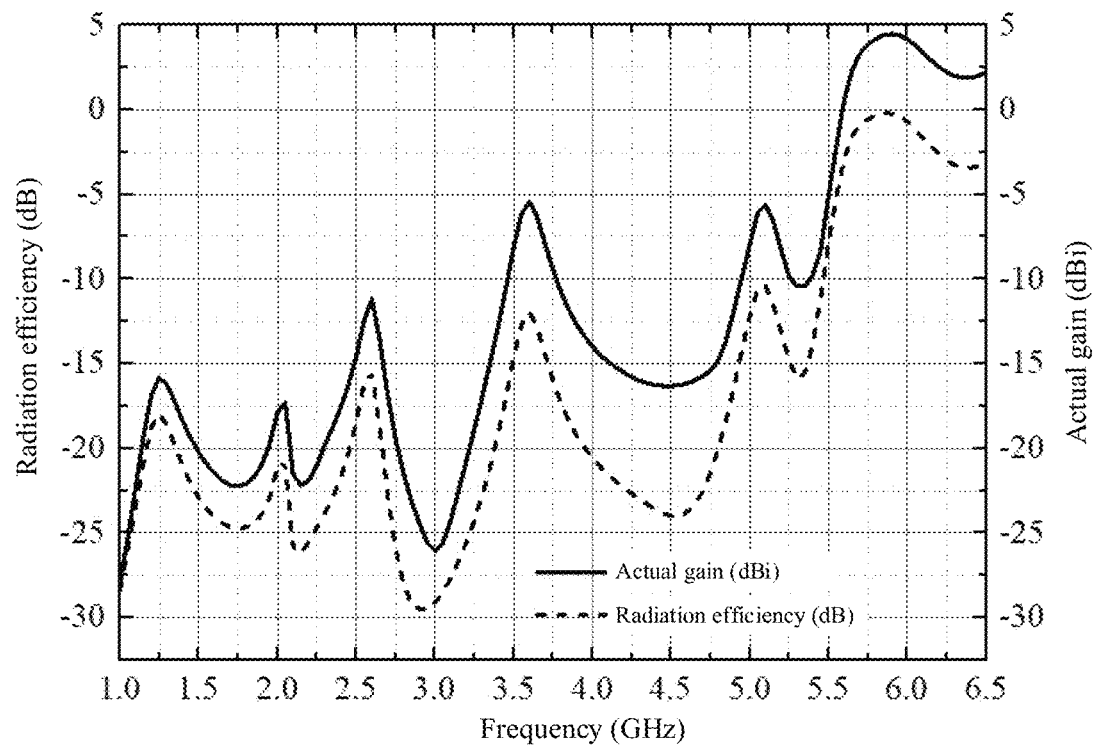
FIG. 7 is a graph showing gain and efficiency curves of a feed line filtering antenna according to embodiment 1 of the present disclosure.

As shown in FIG. 7, it is a simulation result diagram of gain-frequency and radiation efficiency-frequency of the feed line filtering antenna according to this embodiment. The gain in the operating frequency band is about 4.3 dBi, high roll-off filtering characteristics are provided on two sides of the passband, and filtering suppression of 5-5.5 GHz exceeding 10 dB is achieved. In addition, the antenna efficiency in the operating frequency band is about −0.5 dB, and no additional insertion loss is introduced, which meets the operating efficiency requirements of a terminal antenna.

Figure 8:
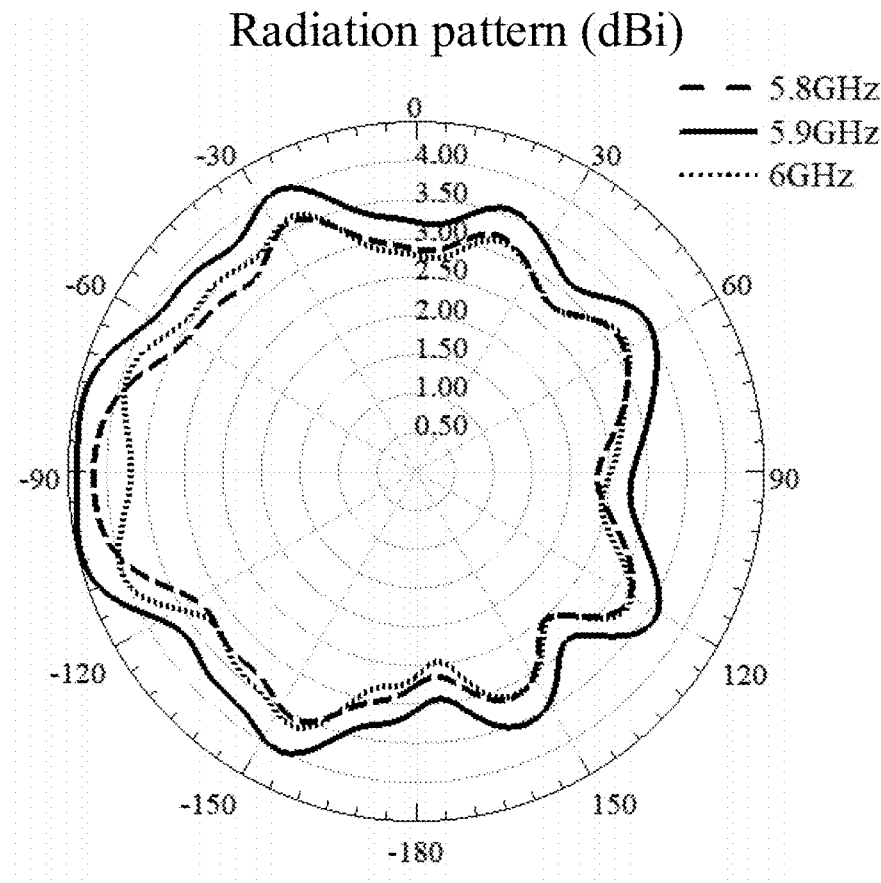
FIG. 8 is a graph showing horizontal radiation pattern curves of a feed line filtering antenna according to embodiment 1 of the present disclosure.

As shown in FIG. 8, it is a radiation pattern of the feed line filtering antenna provided by this embodiment. In this embodiment, the maximum radiation direction is horizontal, the out-of-roundness of the radiation pattern is 1.65 dB, and the horizontal radiation gain is up to 4.46 dBi, which has good high-gain omnidirectional radiation performance.

In this embodiment, the size of a relevant structure may be adjusted according to requirements to adapt to different frequency bands in the receiving and transmitting device of the wireless communication system. This embodiment is particularly applicable in an open and complicated communication scenario due to the filtering characteristic of the present disclosure. Meanwhile, benefiting from the integration of filtering characteristics with the radiation characteristics, this embodiment is also applicable to the integration of wireless mobile communication system devices.

Embodiment 2

Figure 9A:
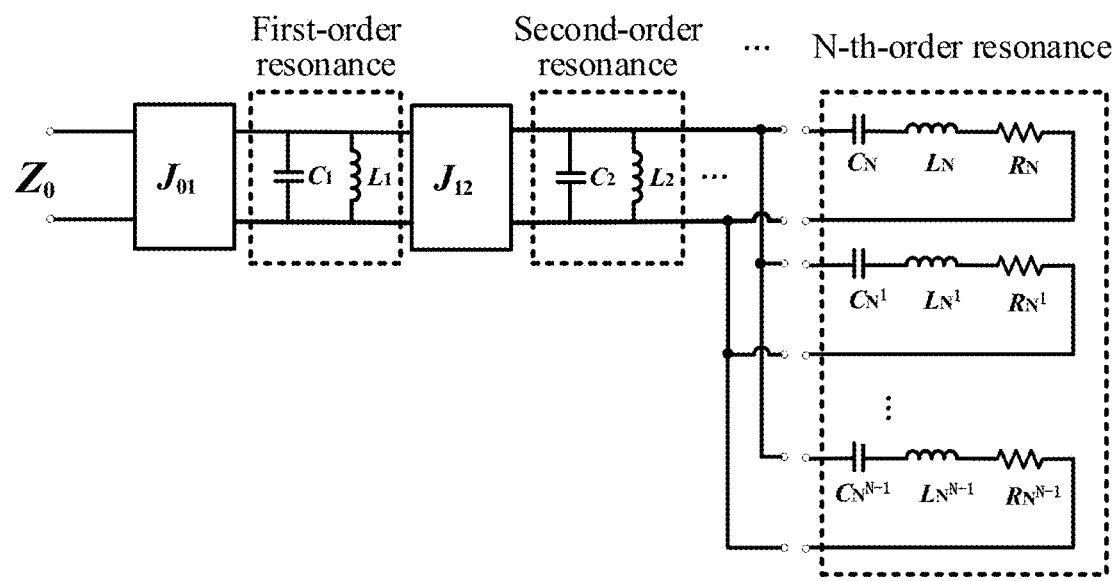
FIGS. 9a-9b are equivalent circuit diagrams of a feed line filtering antenna having resonances of N orders according to embodiment 2 of the present disclosure.
Figure 9B:
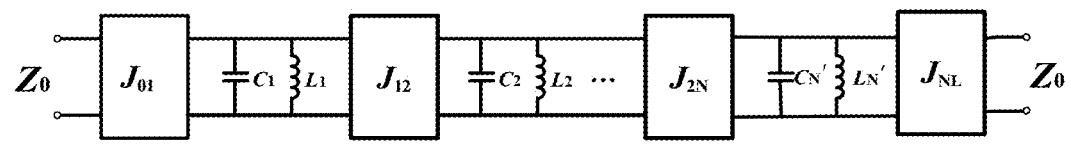

When a feed line filtering antenna having N (N≥3) orders is achieved, additional resonators are coupled to the feed line filtering antenna. Equivalent circuit diagrams of the feed line filtering antenna having resonances of N orders are shown in FIGS. 9A-9b.

Figure 10:
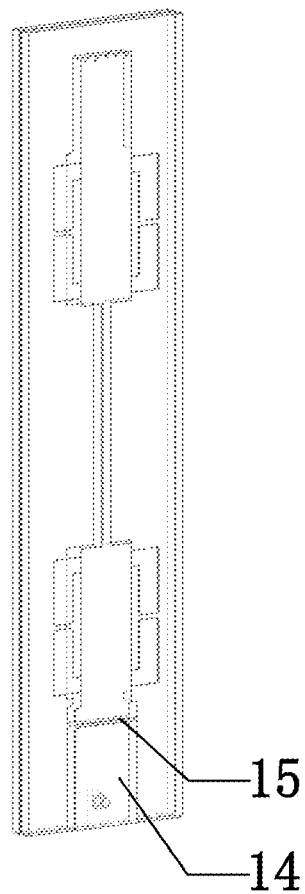
FIG. 10 is a front structural diagram of a feed line filtering antenna according to embodiment 2 of the present disclosure.

This embodiment provides a three-order feed line filtering antenna. A three-order filter network is constructed using two feed lines and radiator structures in the form of feed lines as a resonator, and the equivalent circuit of the antenna corresponds to a filter network when N=3 in FIGS. 9a-9b. As shown in FIG. 10, in this embodiment, an additional parallel double-line resonator 14 is added on the basis of embodiment 1, and the other structures are the same as those of embodiment 1. Further, an additional resonance is introduced in the antenna. A top end of the parallel double-line resonator 14 is open-circuited, and a bottom end thereof is short-circuited and grounded. The parallel double-line resonator 14 is equivalent to a parallel resonance at an operating frequency point, i.e., the first-order resonance in the equivalent circuits of FIGS. 9a-9b. A top end of the second-section parallel double-line resonator 14 is short-circuited, and a bottom end thereof is open-circuited. The second-section parallel double-line resonator 14 is coupled and fed by short parallel double lines through a gap 15 and is equivalent to a parallel resonance at an operating frequency point, i.e., the second-order resonance in the equivalent circuits of FIGS. 9a-9b. Similarly, as in embodiment 1, the feed structure in which a microstrip line turns into parallel double lines of this embodiment is also equivalent to the J converter $J_{01}$ in the equivalent circuits of FIGS. 9a-9b. Each radiator structure includes an upper branch 12 and a lower branch 10 which are symmetrical up and down and equivalent to a series resonance, i.e., the N-th-order (N=3) resonance in the equivalent circuits of FIGS. 9a-9b.

Figure 11:
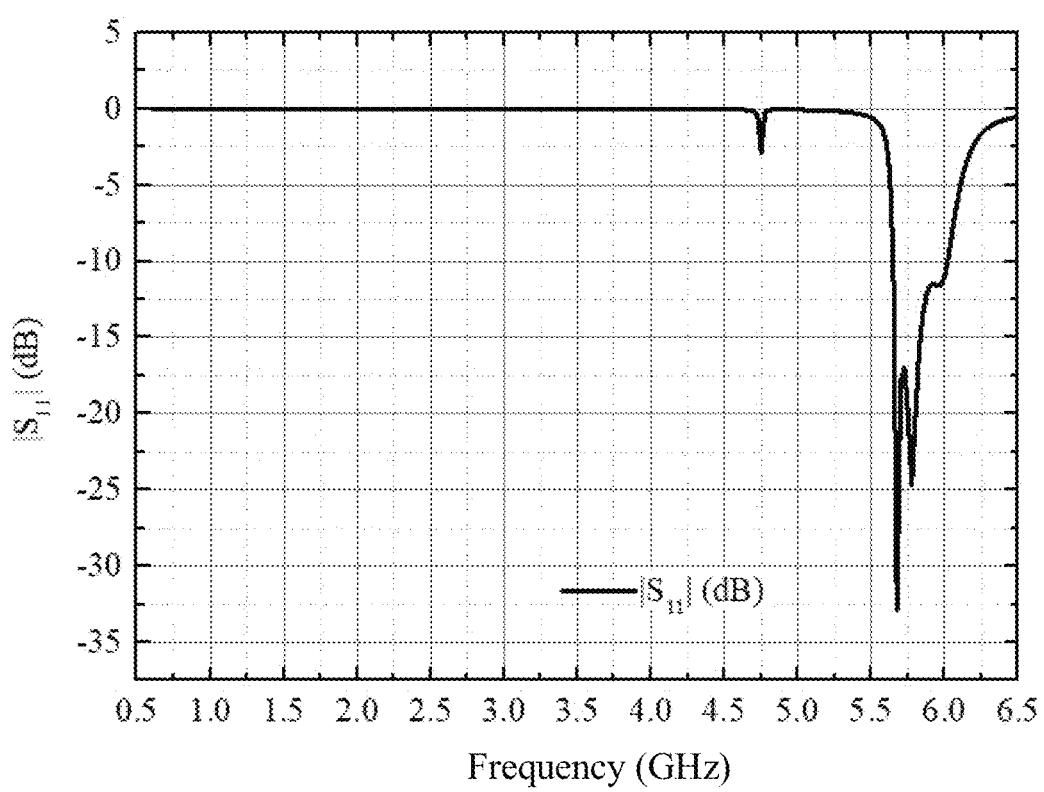
FIG. 11 is a graph showing a scattering parameter curve of a feed line filtering antenna according to embodiment 2 of the present disclosure.

As shown in FIG. 11, it is a simulation result diagram of reflection coefficient |S11|-frequency of the feed line filtering antenna according to embodiment 2 of the present disclosure. The impedance matching in the passband is good, the impedance bandwidth is 5.8-6 GHZ, and the return losses are below −12 dB. There are three resonances within the operating passband of the antenna.

The above two embodiments may verify the applicability of the feed line filtering antenna design method proposed in the present disclosure, and the filtering order may be extended to N orders.

The above are only two preferred embodiments of the present disclosure, but the scope of the present disclosure is not limited to this. Equivalent substitutions or changes made by a person skilled in the art within the scope of the present disclosure and in accordance with the technical solutions of the present disclosure and its inventive concept belongs to the scope of the present disclosure.

The invention claimed is:

1. A feed line filtering antenna, comprising a feed line structure and radiator structures, wherein the feed line structure serves as a first-order resonator; the radiator structures are loaded on the feed line structure, serve as a last-order resonator, and form a two-order filter together with the feed line structure; a band-pass filtering effect of the radiator structures is achieved by controlling the coupling between the first-order resonator and the last-order resonator; when a feed line filtering antenna having three or more orders is achieved, an additional resonator is coupled on a feed line filtering antenna having two orders;

a plurality of radiator structures are provided and distributed from top to bottom; the radiator structures are the same, and a vertical spacing between two radiator structures is one wavelength to realize in-phase feeding and radiation same-direction superposition;

each radiator structure is divided into an upper branch and a lower branch; the upper branch faces downwards, and the lower branch faces upwards; the upper branch and the lower branch have equivalent currents in the same direction in an operating frequency band and together form a dipole radiator;

the upper branch and the lower branch are coplanar; the lengths of the upper branch and the lower branch are less than a quarter wavelength, and a feed distance between the upper branch and lower branch is a half wavelength; the upper branch and the lower branch are jointly equivalent to series resonance.

2. The feed line filtering antenna according to claim 1, wherein the feed line structure adopts a parallel double-line resonator; the parallel double-line resonator comprises an upper surface microstrip line and a lower surface microstrip line, and the upper surface microstrip line and the lower surface microstrip line have the same shape and size.

3. The feed line filtering antenna according to claim 2, wherein one end of the parallel double-line resonator is short-circuited, and the other end of the parallel double-line resonator is open-circuited; or two ends of the parallel double-line resonator are short-circuited or open-circuited.

4. The feed line filtering antenna according to claim 3, wherein when one end of the parallel double-line resonator is short-circuited, and the other end of the parallel double-line resonator is open-circuited, a quarter-wavelength open-circuit line is added to the short-circuited end, or a quarter-wavelength short-circuit line is added to the open-circuited end.

5. The feed line filtering antenna according to claim 3, wherein when two ends of the parallel double-line resonator are short-circuited, the height of the parallel double-line resonator is adjustable to control the resonant frequency of the first-order resonator.

6. A communication device, comprising the feed line filtering antenna according to any one of claim 4.

7. The feed line filtering antenna according to claim 2, wherein the parallel double-line resonator is connected to the radiator structures, and a line width of the parallel double-line resonator near the connection is adjustable to modulate a coupling coefficient between the first-order resonator and the last-order resonator.

8. The feed line filtering antenna according to claim 2, wherein a feed structure of the feed line filtering antenna adopts a feed structure in which a microstrip line turns into parallel double lines; the microstrip line is located on an upper surface of the parallel double-line resonator and connected to a lower surface of the parallel double-line resonator through a metalized through hole, and the metalized through hole is not in contact with the upper surface of the parallel double-line resonator.

9. The feed line filtering antenna according to claim 8, wherein the height of the metalized through hole of the feed structure is adjustable to modulate an external Q value of the parallel double-line resonator so as to control the coupling of external energy to the parallel double-line resonator.

10. The feed line filtering antenna according to claim 2, wherein positions of the radiator structures are adjustable to adjust the energy coupled between the radiator structures and the parallel double-line resonator by adjusting a distance between the radiator structures and a current zero on the parallel double-line resonator.

11. The feed line filtering antenna according to claim 2, wherein line widths of mid-section parallel double lines between each two adjacent radiator structures are adjustable to adjust a coupling coefficient between the first-order resonator and the last-order resonator as well as an antenna radiation Q value so as to control an upper side lobe of the antenna.

12. The feed line filtering antenna according to claim 1, wherein the size of each radiator structure is adjustable to control the resonant frequency of the last-order resonator, a coupling coefficient between the last-order resonator and the first-order resonator, and a radiation Q value.

* * * * *